UNITED STATES PATENT OFFICE.

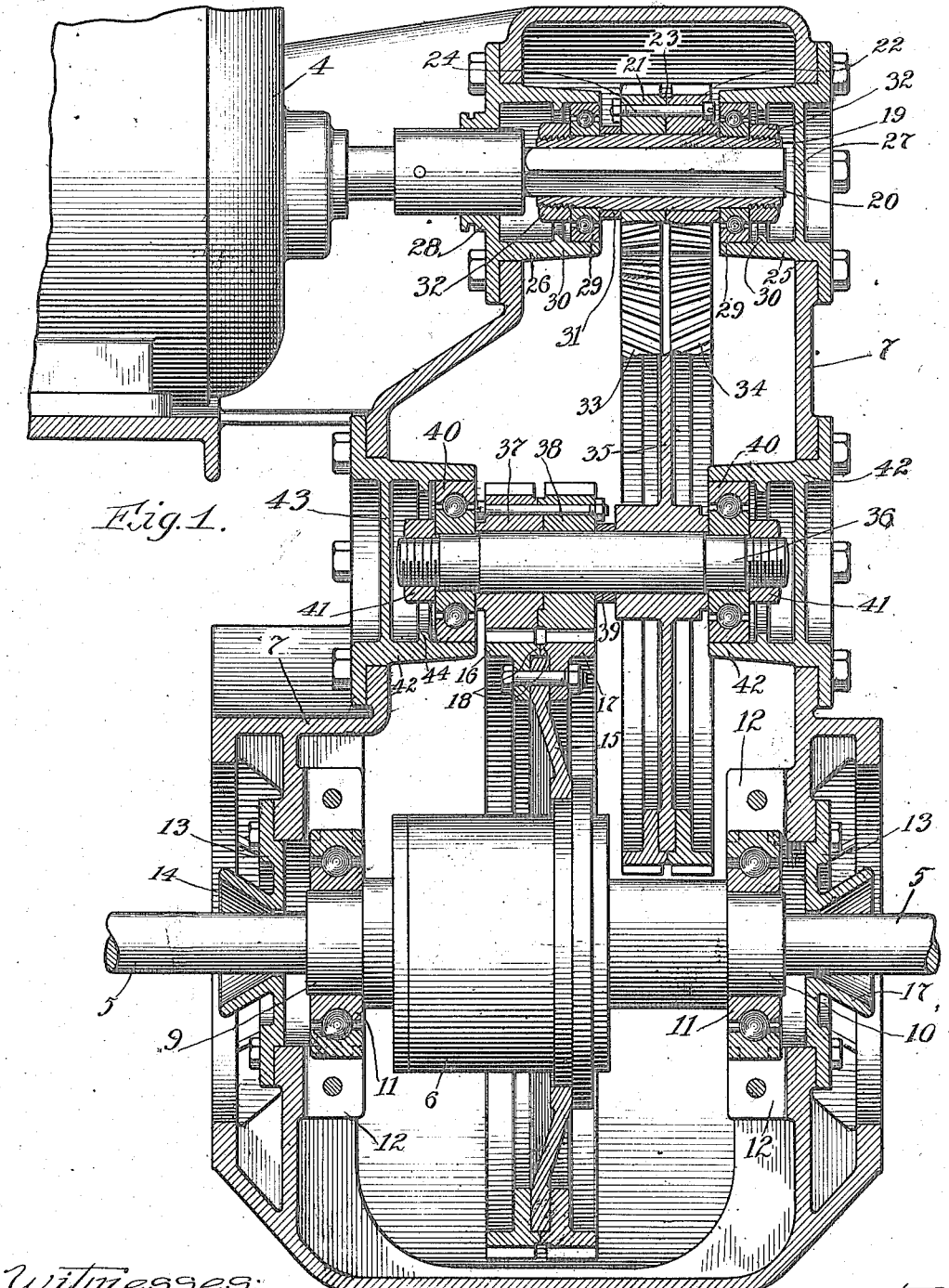

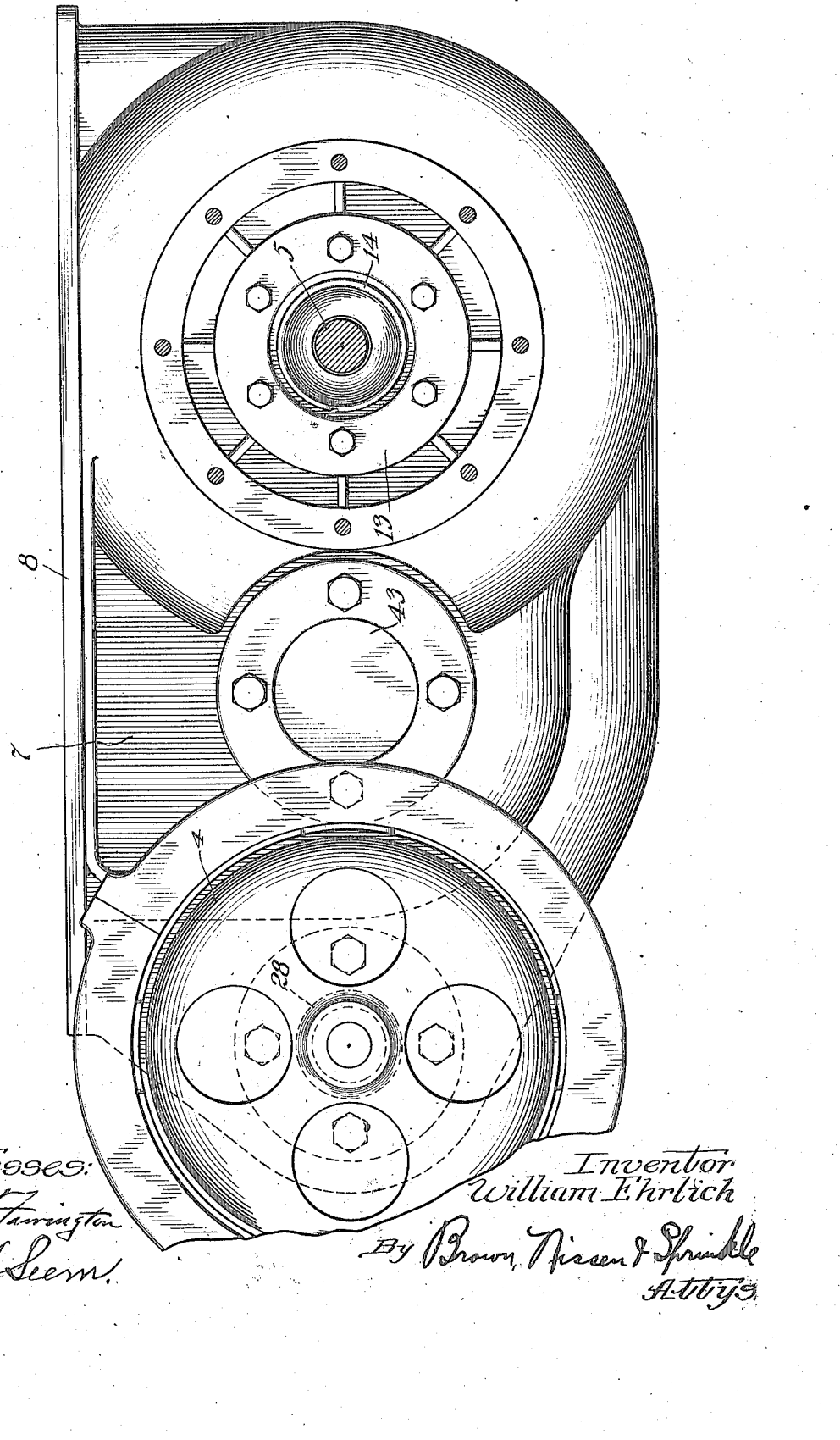

WILLIAM EHRLICH, OF CHICAGO, ILLINOIS, ASSIGNOR TO CASE & MARTIN CO., OF CHICAGO, ILLINOIS, A CORPORATION OF ILLINOIS.

TRANSMISSION-GEARING.

1,143,617.  Specification of Letters Patent.  Patented June 22, 1915.

Application filed December 31, 1914. Serial No. 879,817.

*To all whom it may concern:*

Be it known that I, WILLIAM EHRLICH, a citizen of the United States, residing at Chicago, in the county of Cook and State of Illinois, have invented certain new and useful Improvements in Transmission-Gearing, of which the following is a specification.

This invention relates to a driving mechanism or to transmission gearing particularly designed and adapted for use in connection with motor vehicles.

The principal object of the invention is to provide an improved simple and accessible mechanism of this kind, which can be easily repaired or replaced.

A further object of the invention is to improve the construction of the gearing so that it will be self centering, and to so arrange the gears that they will provide a simple, direct drive.

Other and further objects will appear hereinafter.

In the drawings, Figure 1 is a view, mostly in section, showing the construction and arrangement of gearing constructed in accordance with the principles of this invention; Fig. 2 is a side elevation of the casing in which the gearing is placed.

Although the present invention may have a general application to any class of transmission mechanism, it is particularly designed and adapted for use in connection with electric motor vehicles, and the principal improvement in the present construction consists in the simple and direct arrangement of the gears for connecting the motor to the drive shafts or the differential, and in the construction of the gears themselves, by reason of which they are maintained in proper alinement with the least friction; and in the manner of mounting and removing the gears.

In the drawings, the driving motor is designated generally by the reference numeral 4, and driving shafts 5 are inserted from the sides into the differential gearing designated generally by the reference numeral 6, the other ends of the shafts 5 being connected to the drive wheels, not shown in the drawing.

The different parts of the transmission gearing proper, including the differential, are inclosed in a casing 7, which, as shown more clearly in Fig. 2, is provided with a flat top 8 bolted or otherwise suitably secured to the casing. The differential gearing 6 includes as a part thereof the bearing hubs 9 and 10, which are mounted by means of roller bearings 11 in fixed bearing boxes 12 of the casing. An outer centering plate 13 is provided, which is secured to the casing concentric with the bearing boxes 12, each plate being provided with a divergent centering guide 14, through which the shafts 5 are guided when they are inserted into the differential.

Secured to the differential gearing 6 is a gear spider 15, to the periphery of which are bolted 2 gear sections 16 and 17. These gear sections have oppositely extending teeth, preferably right and left hand spiral teeth, and are each formed with an internal shoulder 18, which spaces them slightly apart to prevent locking and binding with another gear of the same kind.

Adjacent the motor end of the casing, a driving sleeve 19 is mounted, in which a driving shaft 20, secured to the motor, may be inserted and to which the shaft is secured for driving, in any suitable manner, as, for example, by providing a sleeve with a rectangular hole and inserting a corresponding rectangular shaft therein. Mounted upon this sleeve and secured thereto is a drive pinion consisting of right and left hand spiral-toothed sections 21 and 22. These sections are likewise each formed with a shoulder 23, which slightly separates the teeth and prevents them from meeting, and thereby prevents binding and locking. The pinion sections are secured together by suitable fastening devices 24. For mounting the drive sleeve 19 in the casing, inwardly extending bearing glands 25 and 26 are provided, one of which, as 25, is formed with a closing and strengthening web 27, and the other of which is formed with a collar 28 through which the motor shaft extends. A roller or anti-friction bearing 29 is mounted on each end of the sleeve 19, which is freely movable in the ends of the bearing glands 25 and 26, but the bearing glands are preferably each provided with an internal shoulder 30, for limiting the longitudinal movement of the bearings. A drive sleeve spacer 31 may also be positioned on the sleeve 19, for properly positioning the parts, and all of the parts on the drive sleeve are confined and held by nuts 32 threaded on the ends of the sleeve. This forms a connected construction which is bodily removable as a whole from the casing, by simply loosening the bearing glands and withdrawing them slightly from the casing, whereupon the pinion may be lifted clear of the gear with which it meshes, and removed either from the top of the casing, or, if the gear with which it meshes and the outer gland 25 are removed, it may be taken out of the opening in which this latter gland is placed.

Interposed between the gear on the differential and the driving pinion on the sleeve 19, is a reducing connection consisting of a gear formed of sections 33 and 34, meshing with the pinion on the sleeve 19 and secured to a spider 35 mounted on axle 36. Also secured to the axle 36 is a drive pinion consisting of sections 37 and 38, meshing with the sections 16 and 17 secured to the spider 15. This pinion, consisting of the sections 37 and 38, is constructed similarly to the pinion mounted on the sleeve 19. Interposed between the spider and the pinion on this axle 36 is a spider 39, and mounted on the ends of the axle are anti-friction bearings 40, held in place thereon by nuts 41. Extending inwardly through the opposite sides of the casing 7 are bearing glands 42, each formed with a strengthening web 43 and a shoulder 44, similar to the glands in which the driving sleeve 19 is mounted, so that a longitudinal movement of the axle 36 is permitted for centering the pinion mounted thereon with respect to the gear sections 16 and 17. The entire structure secured to the axle 36 may also be removed from the casing by withdrawing the bearing glands 42 from the sides, and taking the axle and its parts out of the top of the casing.

It will be seen that by having the gears and pinions made in sections, of which the teeth are opposite spiral teeth, the tendency of each pinion and gear mounted on a longitudinal movable member, such as the axle 36 or the sleeve 19, is to center itself with respect to the fixed gear. If we take the gear that is secured to the differential gearing as the fixed gearing element, the pinion on the axle 36 will center itself with respect to the gear of the differential, and the pinion on the drive sleeve 19 will tend to center itself with respect to the gear with which it meshes on the axle 36. Thus, there is no endwise thrust or friction; the gears and pinions do not tend to wear unduly because of the trust or friction; and, by making spiral teeth on the gears and pinions, a smooth and continuous contact is made between them, which has the greatest contact surface and therefore the greatest driving power, for the size of the gear. By leaving a space between the sections of each gear or pinion, a great amount of friction and binding is avoided, which is present in the herringbone type of gear, and by making the gears and pinions in sections or in separable parts, it is more easy to form and to grind the spiral sections, they are cheaper to make, and if one of the sections is damaged or broken it is cheaper to replace. Added to this is the convenience in assembling and removing the parts, for, as clearly set forth, by simply loosening and partially or wholly withdrawing the bearing glands from the side of the casing, either the axle and its parts or the drive sleeve and its parts, may be freely removed from the top of the casing. It is customary to divide casings of this kind on the center lines of the shafts or pinions, which means that in the ordinary form of casing the upper and lower portions thereof are about equal in size. The present construction provides a different form of bearing supports, and instead of dividing the casing on the center lines of the several axles inserted therein, the casing is formed with a flat top plate.

I claim:

1. In transmission gearing, a longitudinal self-alining gear consisting of right and left hand spiral toothed sections secured together and adapted to coöperate with a correspondingly toothed and longitudinally fixed gear.

2. In transmission gearing, the combination of a longitudinally movable gear formed with right and left hand teeth, and a correspondingly toothed and longitudinally fixed gear with which the first gear meshes, whereby the first gear is maintained in longitudinal alinement.

3. In transmission gearing, the combination with a self-alining gear consisting of oppositely toothed portions, a member to which the portions are secured, and means to permit the free longitudinal movement of the said member.

4. In transmission gearing, the combination with a gear having oppositely toothed portions, a member to which said portions are secured, bearing glands at the ends of the member, and anti-friction bearings between the glands and the member adapted to permit the longitudinal movement of the member.

5. In transmission gearing, the combination with a casing having alined openings in opposite sides, of bearing glands extending from the outside of the casing into said openings, anti-friction bearings freely movable in the bearing glands, a rotatable member mounted in the anti-friction bearings, and a gear secured to the member and movable longitudinally with the member for self-alining.

6. In transmission gearing, the combination with a casing having openings in opposite sides, of bearing glands inserted therein from the outside each having a shoulder spaced from the inner end of the gland, a self-alining gear, a rotatable member to which it is secured, and anti-friction bearings disposed between the rotatable member at its ends and the bearing glands, freely movable longitudinally but limited in such movement by the shoulders.

7. In transmission gearing, the combination with a gear, of a member on which it is mounted, a casing having alined openings in opposite sides, bearing glands adapted to be inserted from the outside and secured in the openings of the casing, and anti-friction bearings for mounting the member in the glands, the gland being formed with a strengthening web substantially in line with the side of the casing to strengthen the casing.

8. In transmission gearing, the combination with gears, of a casing therefor having an open top, a removable plate for the top, and removable means for supporting the gears for axial self-alining movement from the sides of the casing.

9. In transmission gearing, the combination with a train of gears, of a casing having an open top and alined side openings, a plate for the top, and removable bearing glands for supporting the gears of the train for axial self alining movement and adapted to be inserted from the outside of the openings and to be secured to the casing.

10. In transmission gearing, the combination with a gear, of a member on which the gear is mounted and secured, anti-friction bearings adjacent the ends of the member, a spacer mounted on the member intermediate the bearings, fastening devices at the ends of the member for holding the parts on the member in proper position thereon, and means to removably mount the member from the ends for axial self-alining movement.

11. In transmission gearing, the combination with a casing having a flat top opening and alined side opening, a gearing member mounted in the casing, shafts adapted to be inserted from the sides of the casing into the gearing member, removable plates with shaft guiding portions concentric with the gearing member and secured to the outside of the casing, other gearing members connected with the first said gearing member, and means for supporting the other said gearing members for free longitudinal movement with respect to the first gearing member.

12. In transmission gearing, the combination with a casing, of a shaft driving gearing fixed against longitudinal movement in the casing, a driving shaft, self-alining driving gears connecting the shaft driving member and the driving shaft, means for mounting the said gears for free longitudinal movement with respect to the shaft driving gear and the driving shaft, whereby the said driving gears will aline themselves with respect to the shaft driving gear.

In testimony whereof I have signed my name to this specification, in the presence of two subscribing witnesses, on this 28th day of December, A. D. 1914.

WILLIAM EHRLICH.

Witnesses:
H. J. GREEN,
CHAS. M. NISSEN.